United States Patent [19]
Koek et al.

[11] Patent Number: 5,949,039
[45] Date of Patent: Sep. 7, 1999

[54] SERVICE DOOR INTERLOCK

[75] Inventors: Kevin C. Koek; Harold A. Paschal, both of Rochester; Thomas L. Schwartz, Fairport; David R. Gotham, Rochester, all of N.Y.

[73] Assignee: Eastman Kodak Company, Rochester, N.Y.

[21] Appl. No.: 08/954,549

[22] Filed: Oct. 20, 1997

[51] Int. Cl.⁶ ..................................................... H01H 9/20
[52] U.S. Cl. .................. 200/50.1; 200/43.13; 200/43.18; 200/43.22
[58] Field of Search .................... 174/66, 67; 200/50.01, 200/50.02, 50.1, 50.11, 318, 318.1, 321, 322, 50.12–50.14, 50.18, 293, 333, 43.01, 43.11, 43.13, 43.16, 43.18, 43.17, 43.21, 43.22; 361/600, 627, 628, 631, 632, 837, 679, 724, 729, 726, 727, 643; 439/133–136, 142

[56] References Cited

U.S. PATENT DOCUMENTS

| | | | |
|---|---|---|---|
| 3,186,981 | 6/1965 | Ronde | 200/169 |
| 3,622,720 | 11/1971 | Allen | 200/50 A |
| 4,017,771 | 4/1977 | Baumann | 361/357 |
| 4,079,214 | 3/1978 | Castonguay et al. | 200/50 A |
| 4,483,601 | 11/1984 | Sekida et al. | 354/288 |
| 4,952,760 | 8/1990 | Wilson, Jr. | 200/302.1 |
| 5,021,616 | 6/1991 | Hardt | 200/43.16 |

*Primary Examiner*—Michael A. Friedhofer
*Attorney, Agent, or Firm*—Lawerence P. Kessler

[57] ABSTRACT

An interlock switch access control apparatus controls access to an interlock switch (12) positioned in a cavity (14) in a housing (16). The interlock switch access control apparatus includes a plate (32) for sliding above the cavity (14) in a slot (30) in the housing (16), with the plate (32) having a plurality of apertures (38, 40). A detent (34) is positioned in a first aperture (38) of the plate (32) for fixing the position of the plate (32) in a first position over the cavity (14) to cover the interlock switch (12) to prevent access thereto. A resilient member such as a spring (48) applies a restoring force to the detent (34) to push the detent (34) toward the plate (32). The resilient member pushes the detent (34) toward and through the first aperture (38) when the plate (32) is positioned with the first aperture (38) in a longitudinal path of the detent (34). The detent (34) responds to a releasing force opposing the restoring force to move out of the first aperture (38) to release the plate (32) therefrom and so to allow the plate (32) to slide in the slot (30). A main access cover (20) is pivotally mounted to the housing (16) to cover the plate (32) in a closed position, and pivots to an open position to expose the plate (32). A lip (50) at one end of the main access cover (20) pivots when the main access cover (20) pivots, so that the lip (50) contacts the plate (32) in the second position when the main access cover (20) is in the open position to prevent the main access cover (20) from pivoting to the closed position.

15 Claims, 3 Drawing Sheets ized elements, steps, and features, as shown in FIGS. 1–5, the present

SERVICE DOOR INTERLOCK

FIELD OF THE INVENTION

This disclosure relates generally to the field of access panels, and in particular to mechanisms for limiting the opening and closing of access panels and the operation of elements therein.

BACKGROUND OF THE INVENTION

Machines such as copiers include service access panels and cover plates which, when removed, allow a person to access, handle, and/or operate the components of the machine. Typically, such machines automatically disable themselves to await maintenance and/or repairs, so that further operation does not cause and/or compound any damage.

An interlock switch is a device which, when actuated by a service person, reactivates a deactivated machine so that proper maintenance and/or repairs may be effected. Heretofore, such interlock switches have been exposed and/or readily accessible to a non-service person. Accordingly, prior art interlock switches allow such non-service persons to inadvertently or purposely reactivate the deactivated machine. Such reactivation may cause damage if not properly supervised or performed by the service person.

Accordingly, a need exists for an interlock switch and/or an access panel for use with an interlock switch which is accessible to service personnel and which may not be readily accessible to non-service personnel.

SUMMARY OF THE INVENTION

It is recognized herein that a detent may be used to prevent removal of a plate covering an interlock switch in order to prevent access and so to prevent actuation of the interlock switch.

An interlock switch access control apparatus controls access to an interlock switch positioned in a cavity in a housing. The interlock switch access control apparatus includes a plate for sliding above the cavity in a slot in the housing, with the plate having a plurality of apertures. A detent is positioned in a first aperture of the plate for fixing the position of the plate in a first position over the cavity to cover the interlock switch to prevent access thereto. A resilient member such as a spring applies a restoring force to the detent to push the detent toward the plate. The resilient member pushes the detent toward and through the first aperture when the plate is positioned with the first aperture in a longitudinal path of the detent. The detent responds to a releasing force opposing the restoring force to move out of the first aperture to release the plate therefrom and so to allow the plate to slide in the slot. A main access cover is pivotally mounted to the housing to cover the plate in a closed position, and pivots to an open position to expose the plate. A lip at one end of the main access cover is pivoted when the main access cover pivots, so that the lip contacts the plate in the second position when the main access cover is in the open position to prevent the main access cover from pivoting to the closed position.

BRIEF DESCRIPTION OF THE DRAWINGS

The features of the present invention will become readily apparent and are to be understood by referring to the following detailed description of the preferred embodiments of the present invention, taken in conjunction with the accompanying drawings, in which.

DETAILED DESCRIPTION OF THE INVENTION

Referring in specific detail to the drawings, with common reference numbers identifying similar or identical elements, steps, and features, as shown in FIGS. 1–5, the present disclosure describes a service door interlock with improved security to access an interlock switch, which allows a service person such as a repair technician to activate a deactivated machine using the interlock switch for proper servicing, but having mechanisms which prevent ordinary or non-service personnel from activating the deactivated machine via the interlock switch. The machine may be a copier or other devices which may require maintenance and/or which may malfunction during use.

Figure 1:
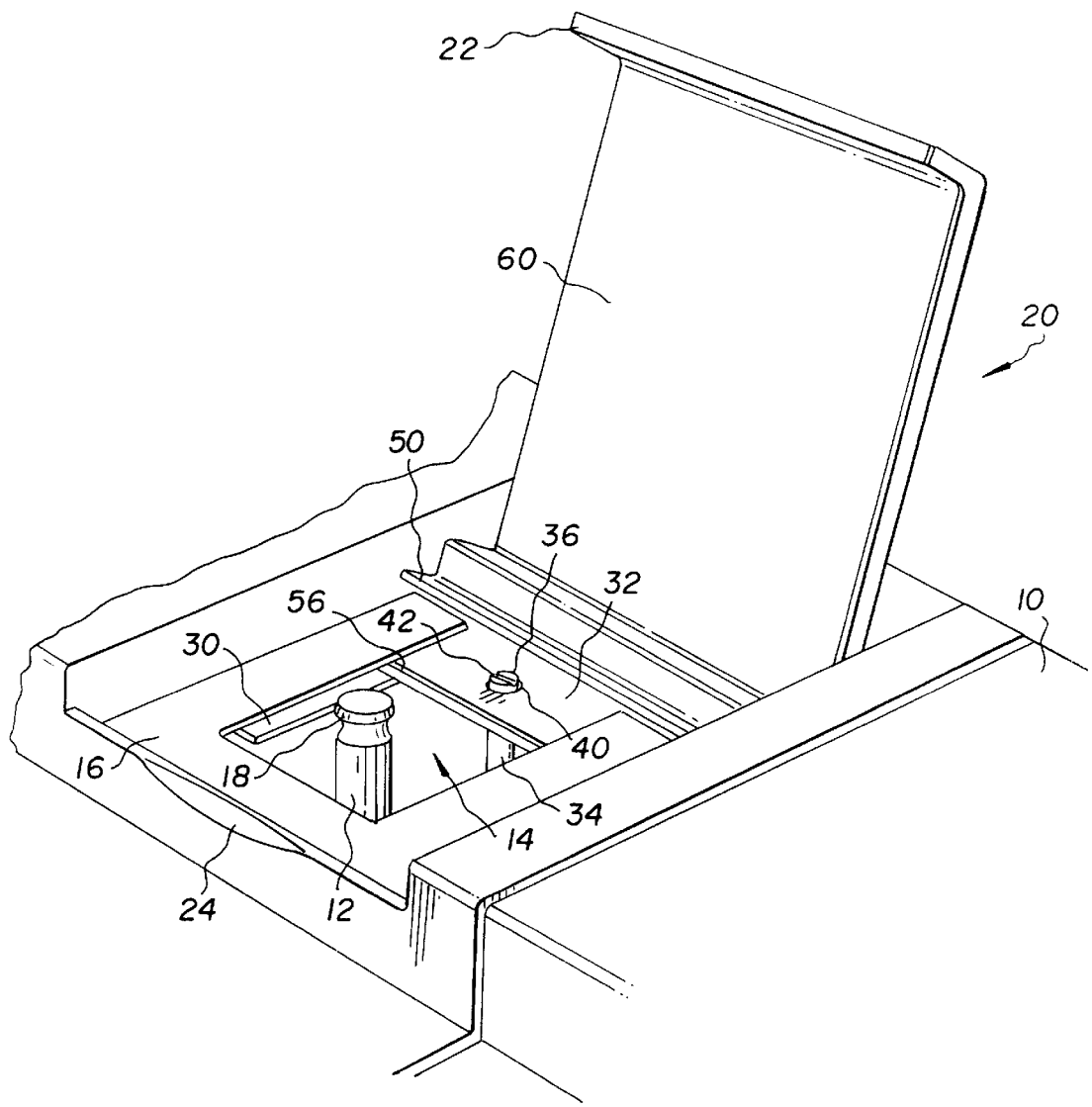
FIG. 1 is a perspective view of the service door interlock switch.

As shown in FIG. 1, a copier 10 has an interlock switch 12 which is positioned within a cavity 14 in the housing 16 of the copier 10. The interlock switch 12 may be actuated by manually lifting or depressing the knob or end 18. For example, the interlock switch 12 may be lifted to activate the copier 10 and thus to override the automatic deactivation feature of the copier 10.

The cavity 14 and the interlock switch 12 positioned therein may be accessible by moving a main access cover 20 or access panel. In a closed or covering position, as shown in FIG. 3, the main access cover 20 is positioned over the housing 16 and the cavity 14 with the interlock switch 12 in a depressed position. The main access cover 20 may then be moved to an open position, as shown in FIGS. 1–2 and 4–5, for example, by having the service person grasp the end 22 of the main access cover 20. A depressed surface 24 or indentation may be formed in the housing 16 to facilitate the grasping of the end 22 of the main access cover 20.

In the illustrative embodiment shown in FIGS. 1–5, the main access cover 20 may be pivotal. For example, the main access cover 20 may be mounted or may engage pins 26, 28 to pivot about an axis.

Figure 5:
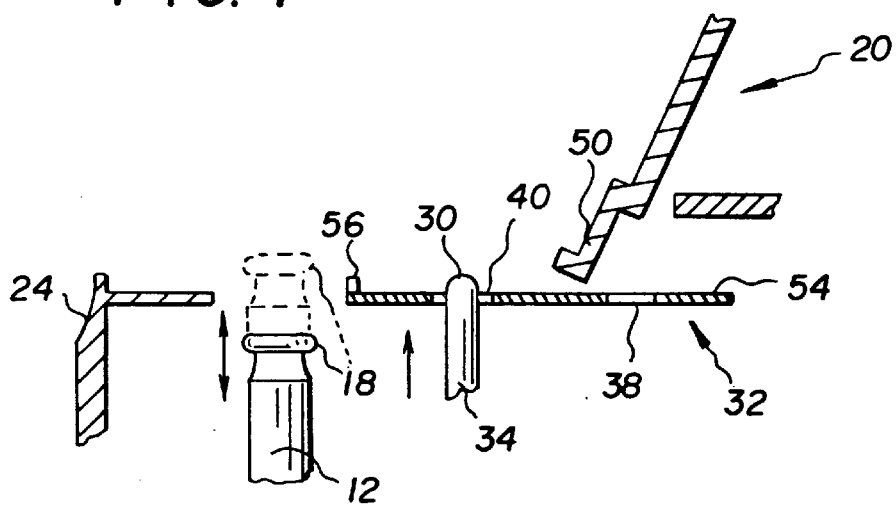

The housing 16 includes slots 30 positioned on either side of the cavity 14. A sliding plate 32 is positioned in the slots 30 over the cavity 14. The sliding plate 32 slides within the slots 30 to cover the interlock switch 12 in at least a first position, such as shown in FIG. 3, and to expose the interlock switch 12 in at least a second position, such as shown in FIG. 5. A detent 34 is positioned in the cavity 14, with a detent head 36 protruding to engage the sliding plate 32. The sliding plate 32 includes at least two apertures 38, 40 through which the detent head 36 protrudes to hold the sliding plate 32 in position, and so to prevent sliding of the sliding plate 32 in the slots 30.

To release the sliding plate 32 from the detent 34, a service person pushes the detent head 36 downward and into the respective aperture 38, 40. In a preferred embodiment, the detent head 36 includes an engagement slot 42 adapted to receive the end of a tool to facilitate the pushing of the detent head 36 downward by the service person.

Figure 2:
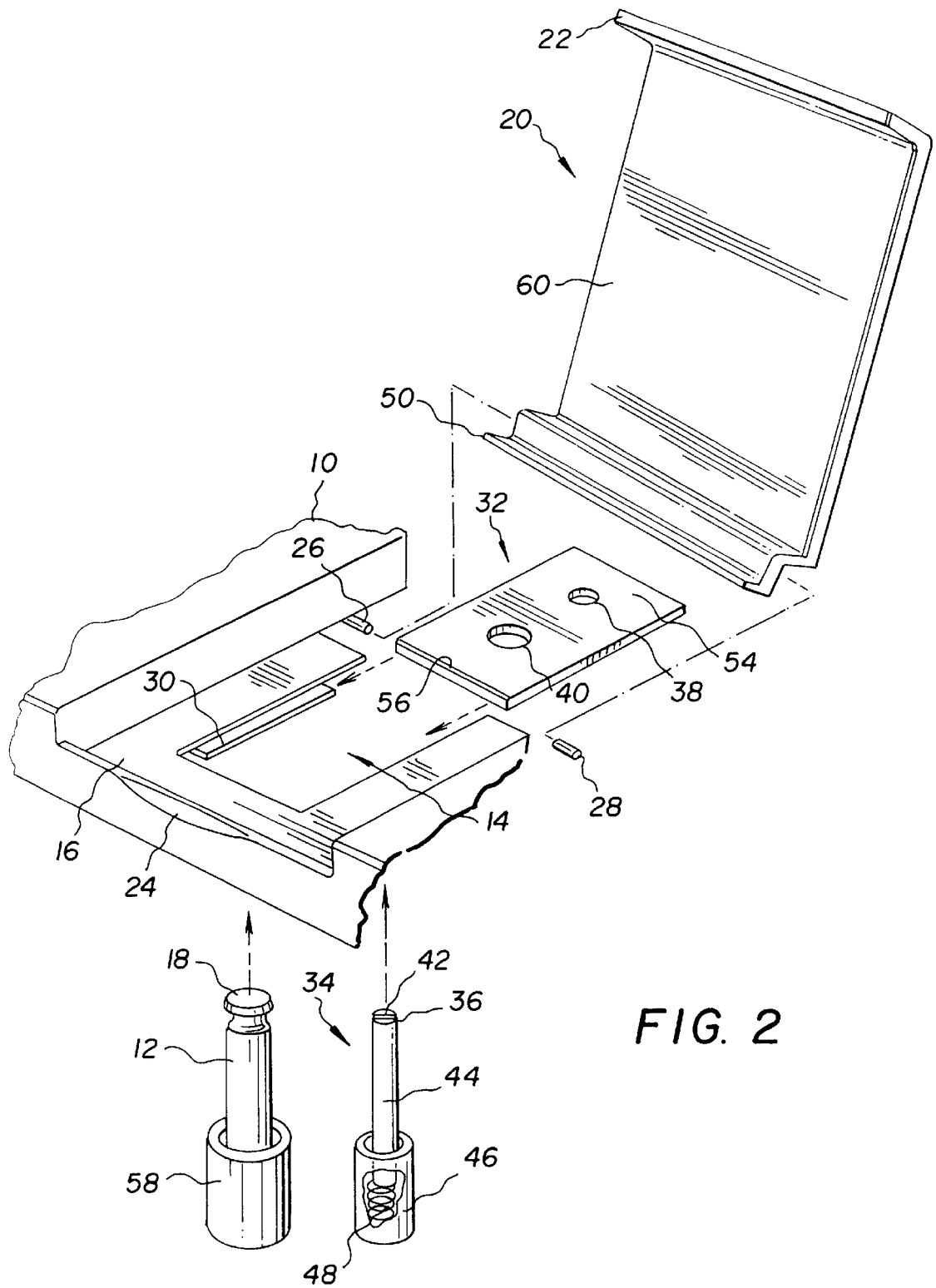
FIG. 2 is a perspective view with parts separated of the service door interlock switch of FIG. 1.
Figure 3:
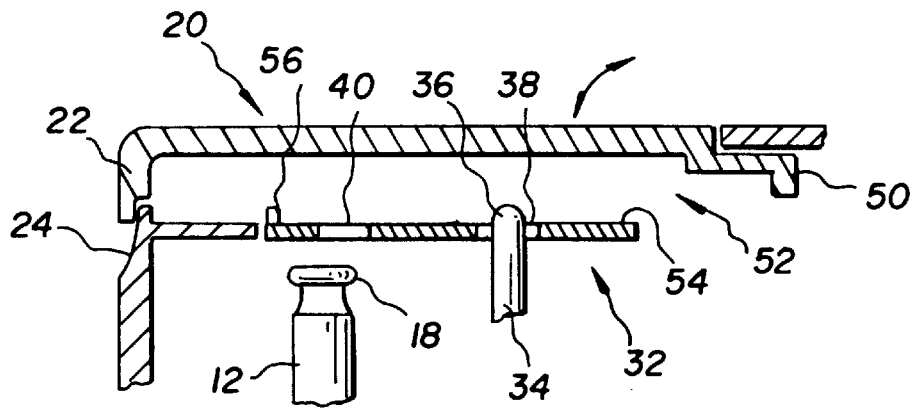
FIGS. 3–5 are side cross-sectional views of a sliding plate and detent being progressively moved to expose the service door interlock switch.

As shown in FIG. 2, the detent 34 includes an elongated shaft 44 having the detent head 36 and the engagement slot 42 at one end. The other end of the elongated shaft 44 may be positioned in a base 46 to engage a resilient member providing a restoring force which attempts to move the detent head 36 upward along a longitudinal path. The resilient member may be a spring 48. In a preferred embodiment, the spring 48 has a sufficiently high spring constant such that the detent head 36 is forced through a respective aperture 38, 40, and such that a person may not easily push the detent head 36 downward through the respective aperture 38, 40 without a tool engaging the engagement slot 42.

As shown in FIG. 3, the main access cover 20 is positioned to cover the cavity 14 with the sliding plate 32 in the first position covering the interlock switch 12. The detent head 36 passes through the aperture 38 to lock the sliding plate 32 in the first position.

Figure 4:
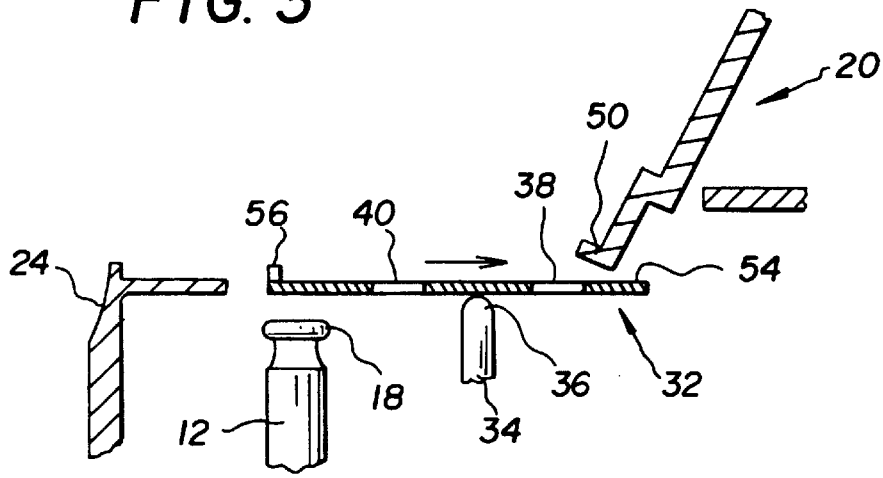

A service person accesses the interlock switch 12 by first raising the main access cover 20 to the open position, as shown in FIGS. 1–2 and 4. As shown in FIG. 3, the main access cover 20 has a lip 50 which pivots as the main access cover 20 pivots about the pins 26, 28. The lengths of the lip 50 and the sliding plate 32 are dimensioned such that there is a spacing 52 therebetween the lip 50 and an end portion 54 of the sliding plate 32, with the spacing 52 of sufficient size to permit the pivoting of the main access cover 20 and the lip 50 through the spacing 52.

With the main access cover 20 pivoted in the open position, the sliding plate 32 and the detent head 36 passing through the aperture 38 are then exposed. The service person may then use a tool to contact the engagement slot 42. With the tool, the service person may apply a force opposing the restoring force of the spring 48 to push the detent head 36 down to a position below the sliding plate 32. With the detent head 36 depressed, the sliding plate 32 is free to be moved in the direction of the arrow through an intermediate position, as shown in FIG. 4, to the second position as shown in FIG. 5. Once the sliding plate 32 is moved away from the first position, the service person removes the tool from the engagement slot 42.

The sliding plate 32 may include a ridge 56 or other protruding element which enhances frictional contact with the hand of the service person so that the service person may slide the sliding plate 32, as shown in FIGS. 4–5.

When the sliding plate 32 has been moved by the service person to the second position, as shown in FIG. 5, the restoring force of the spring 48 forces the detent head 36 upward and through the aperture 40 to fix the sliding plate 32 in the second position.

With the sliding plate 32 moved to the second position, the cavity 14 and the interlock switch 12 positioned therein are exposed, as shown in FIGS. 1 and 5. The exposed interlock switch 12 is now freely accessible, and may be raised and lowered manually, for example, by the service person grasping the knob 18 of the interlock switch 12. As shown in FIG. 2, the interlock switch 12 may be mounted in a base 58 having electric and/or mechanical contacts to actuate the interlock feature to activate the deactivated copier 10, and also to actuate the interlock feature to deactivate the activated copier 10.

In order to close the main access cover 20, the interlock switch 12 must be manually lowered and the sliding plate 32 must be moved forward to cover the lowered interlock switch 12, which may be described with respect to FIGS. 3–5 in reverse order than the access operation as described above. Referring to FIG. 5, after the interlock switch 12 is lowered, the service person uses a tool to push the detent head 36 downward and through the aperture 40. The sliding plate 32 may then be moved forward, in the direction opposite to the arrow, though an intermediate position shown in FIG. 4 to the first position, as shown in FIG. 3.

Once returned to the first position, the sliding plate 32 covers the cavity 14, with the lowered interlock switch 12 and the detent 34 positioned within the cavity 14 under the sliding plate 32. The detent head 36 is pushed upward by the restoring force of the spring 48 to pass through the aperture 38 to lock the sliding plate 32 in the first position, as shown in FIG. 3. The service person may then pivot the main access cover 20 downward to cover the sliding plate 32, as shown in FIG. 3.

In addition, the sliding plate 32 also locks the main access cover 20 in the up or open position. As shown in FIGS. 1 and 4–5, the sliding plate 32 is dimensioned such that at least the end portion 54 prevents the main access cover 20 and/or the lip 50 from pivoting downward when the sliding plate 32 is in at least the intermediate position as in FIG. 4; that is, when the sliding plate 32 is moved to expose the interlock switch 12. When the sliding plate 32 is moved to the second position, as shown in FIGS. 1 and 5, to fully expose the cavity 14 and the interlock switch 12, the sliding plate 32 prevents pivoting of the main access cover 20 and/or the lip 50.

Since the interlock switch 12 may be manually raised upward with the sliding plate 32 in the second position, a lowering of the main access cover 20 may damage the interlock switch 12. The lip 50 of the main access cover 20 acts as a fail-safe to prevent the main access cover 20 from being closed when the interlock switch 12 is in a raised position, as in FIG. 5. Accordingly, in order to close the main access cover 20 after service, the interlock switch 12 must be manually lowered, the detent head 36 must be pushed downward using a tool, and the sliding plate 32 must be moved forward to cover the cavity 14 and the lowered interlock switch 12 in order to unlock and pivot the main access cover 20.

The main access cover 20 may also include a surface 60 upon which indicia and/or a label is positioned for getting the attention of the person raising the main access cover 20. For example, instructions may be provided for the service person on how to access the interlock switch 12; that is, instructing the service person to use an appropriate tool to engage the engagement slot 36. Alternatively, the instructions positioned on the surface 60 may include a warning for non-service personnel to refrain from attempting to access and/or to activate the interlock switch 12.

While the disclosed service door interlock is particularly shown and described herein with reference to the preferred embodiments, it is to be understood that various modifications in form and detail may be made without departing from the scope and spirit of the present invention. Accordingly, modifications such as any examples suggested herein, but not limited thereto, are to be considered within the scope of the present invention.

The invention has been described in detail with particular reference to certain preferred embodiments thereof, but it will be understood that variations and modifications can be effected within the spirit and scope of the invention.

PARTS LIST 10 copier
12 interlock switch
14 cavity
16 housing
18 knob 20 main access cover
22 end
24 depressed surface
26 pin
28 pin
30 slots
32 sliding plate
34 detent
36 detent head
38 aperture
40 aperture
42 engagement slot
44 elongated shaft
46 base
48 spring
50 lip
52 spacing
54 end portion
56 ridge
58 base
60 surface

What is claimed is:

1. An apparatus for controlling access to a cavity in a housing comprising:

a plate for sliding above the cavity in a slot in the housing between a first position in the slot covering the cavity and a second position in the slot exposing the cavity, said plate having a first aperture and a second aperture therethrough; and a detent engagable with said first aperture and said second aperture when the plate is in the first position and the second position, respectively, in the slot, said detent positionable in the first aperture of the plate for fixing the position of the plate in a first position over the cavity and in said second aperture for fixing the position of the plate in the second position to expose the cavity, and movable to a position out of said first and second apertures to release the plate therefrom to allow the plate to slide in the slot.

2. The apparatus of claim 1 further comprising:

a resilient member for applying a restoring force to the detent to push the detent toward the plate; and wherein the detent, responsive to a releasing force opposing the restoring force, moves out of the first aperture.

3. The apparatus of claim 2 wherein the resilient member pushes the detent toward and through the first aperture when the plate is positioned with the first aperture in a longitudinal path of the detent.

4. The apparatus of claim 1 further comprising:

a main access cover movably mounted to the housing to cover the plate in a closed position, and for moving to an open position to expose the plate.

5. The apparatus of claim 4 wherein the plate is movable to a second position exposing the cavity; and wherein a portion of the main access cover contacts the plate in the second position when the main access cover is in the open position to prevent the main access cover from moving to the closed position.

6. The apparatus of claim 5 wherein the portion of the main access cover does not contact the plate in the first position wherein the main access cover is in the open position, allowing the main access cover to move to the closed position.

7. The apparatus of claim 4 wherein the main access cover is pivotally mounted to the housing to pivot between the open and closed positions.

8. An interlock switch access control apparatus for controlling access to an interlock switch positioned in a cavity in a housing comprising:

a plate for sliding above the cavity in a slot in the housing between a first position in the slot covering the cavity and a second position in the slot exposing the cavity, said plate having a first aperture and a second aperture therethrough; and a detent engagable with said first aperture and said second aperture when the plate is in the first position and the second position, respectively, in the slot, said detent positionable in said first aperture of the plate for fixing the position of the plate in a first position over the cavity to cover the interlock switch to prevent access thereto, and in said second aperture to fix the plate in the second position to expose the interlock switch, and movable to a position out of said first and second apertures to release the plate therefrom to allow the plate to slide in the slot.

9. The interlock switch access control apparatus of claim 8 further comprising:

a resilient member for applying a restoring force to the detent to push the detent toward the plate; and wherein the detent, responsive to a releasing force opposing the restoring force, moves out of the first aperture to release the plate therefrom to allow the plate to slide in the slot.

10. The interlock switch access control apparatus of claim 9 wherein the resilient member pushes the detent toward and through the first aperture when the plate is positioned with the first aperture in a longitudinal path of the detent.

11. The interlock switch access control apparatus of claim 8 further comprising:

a main access cover pivotally mounted to the housing to cover the plate in a closed position, and for pivoting to an open position to expose the plate.

12. The interlock switch access control apparatus of claim 11 wherein the main access cover has a lip at one end thereof and is pivotable to a second position exposing the plate; and wherein the lip of the main access cover contacts the plate in the second position when the main access cover is in the open position to prevent the main access cover from pivoting to the closed position.

13. The interlock switch access control apparatus of claim 12 wherein the lip of the main access cover does not contact the plate in the first position wherein the main access cover is in the open position, allowing the main access cover to pivot to the closed position.

14. A method for controlling access to an interlock switch positioned in a cavity in a housing comprising the steps of:

(a) moving a main access panel, covering a plate and detent, to an open position exposing the plate and the detent;

(b) providing a restoring force to the detent to fix the detent in a first aperture of a plate covering the interlock switch and the cavity in a first position to prevent access to the interlock switch;

(c) contacting an engagement slot in a detent head of the detent with a tool;

(d) moving the detent out of the first aperture of the plate; and (e) moving the plate to a second position to expose the interlock switch (f) providing contact between a portion of the main access panel and a portion of the plate when the plate is in the second position to prevent the main access panel from moving out of the open position.

15. The method of claim 14 wherein the step (d) of moving the detent further includes the steps of:

(d1) applying an opposing force to the detent head with the tool; and (d2) countering the restoring force with the opposing force.

* * * * *